US011663233B2

(12) United States Patent
Alexeev et al.

(10) Patent No.: US 11,663,233 B2
(45) Date of Patent: May 30, 2023

(54) RELIABLE VIRTUAL MACHINE DISCOVERY AND STORAGE ASSOCIATION

(71) Applicant: EMC IP Holding Company LLC, Hopkinton, MA (US)

(72) Inventors: Sergey Alexandrovich Alexeev, St. Petersburg (RU); Alexey Vladimirovich Shusharin, St. Petersburg (RU); Dmitry Nikolayevich Tylik, Westborough, MA (US); Fedor Kusov, St. Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 113 days.

(21) Appl. No.: 17/197,563

(22) Filed: Mar. 10, 2021

(65) Prior Publication Data

US 2022/0292105 A1  Sep. 15, 2022

(51) Int. Cl.
| | |
|---|---|
| *G06F 16/248* | (2019.01) |
| *G06F 16/25* | (2019.01) |
| *G06F 16/22* | (2019.01) |
| *G06F 16/21* | (2019.01) |
| *G06F 9/455* | (2018.01) |
| *G06F 16/2457* | (2019.01) |

(52) U.S. Cl.
CPC ........ *G06F 16/256* (2019.01); *G06F 9/45558* (2013.01); *G06F 16/214* (2019.01); *G06F 16/2282* (2019.01); *G06F 16/248* (2019.01); *G06F 16/24573* (2019.01); *G06F 2009/4557* (2013.01)

(58) Field of Classification Search
CPC .. G06F 16/256; G06F 9/45558; G06F 16/214; G06F 16/2282; G06F 16/24573; G06F 16/248; G06F 2009/4557
See application file for complete search history.

(56) References Cited

U.S. PATENT DOCUMENTS

| | | |
|---|---|---|
| 7,484,066 B2 * | 1/2009 | Shitomi ................. G06F 3/067 711/170 |
| 8,850,208 B1 | 9/2014 | Parkinson |
| 9,021,255 B1 | 4/2015 | Aharoni et al. |
| 9,378,219 B1 | 6/2016 | Bono et al. |
| 9,430,480 B1 | 8/2016 | Bono |
| 9,454,326 B1 | 9/2016 | Bono et al. |
| 9,933,957 B1 | 4/2018 | Cohen et al. |
| 9,940,155 B1 | 4/2018 | Lee et al. |
| 9,983,896 B1 | 5/2018 | Naik et al. |
| 10,678,576 B1 | 6/2020 | Taylor et al. |
| 10,719,257 B1 | 7/2020 | Meiri et al. |

(Continued)

*Primary Examiner* — Wilson Lee
(74) *Attorney, Agent, or Firm* — BainwoodHuang

(57) ABSTRACT

A technique of managing virtual volumes includes receiving, by a storage system, instructions to create specified virtual volumes in the storage system, the instructions including virtual volume metadata that identifies virtual machines to which the specified virtual volumes are assigned, and providing a database that associates such virtual volumes with the virtual machines identified by the virtual volume metadata. The technique further includes performing a storage activity on a virtual machine by identifying, from the database, multiple virtual volumes that the database associates with the virtual machine and performing the storage activity on all of the identified virtual volumes together as a group.

20 Claims, 4 Drawing Sheets

(56) References Cited

U.S. PATENT DOCUMENTS

| | | |
|---|---|---|
| 10,768,837 B2 | 9/2020 | Tylik et al. |
| 10,860,427 B1 * | 12/2020 | Chakraborty ....... G06F 11/1464 |
| 11,237,747 B1 * | 2/2022 | Greenwood .......... G06F 3/0644 |
| 2021/0318824 A1 * | 10/2021 | Cain ..................... G06F 3/0644 |
| 2021/0405902 A1 * | 12/2021 | Sangle ................... G06F 3/067 |
| 2022/0035574 A1 * | 2/2022 | Cain ..................... G06F 3/0611 |
| 2022/0057947 A1 * | 2/2022 | Sangle ................. G06F 3/0644 |

* cited by examiner

| Shadow VM Table 152 | | |
|---|---|---|
| ID | VM_UUID | VM_Name |
| 1 | "dca912…" | "Engineering" |
| 2 | "abc321…" | "Accounting" |

310

| VVol Table 154 | | |
|---|---|---|
| ID | NAA | VM_ID |
| 1 | "624a…" | 1 |
| 2 | "123b…" | 1 |
| 3 | "321c…" | 2 |
| 4 | "456a…" | 2 |

320

RELIABLE VIRTUAL MACHINE DISCOVERY AND STORAGE ASSOCIATION

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Many storage systems provide storage resources for supporting virtual machines. Providing such resources may involve storing vVols (virtual volumes), i.e., independently manageable storage objects that represent disk drives of virtual machines. For example, a Windows-based virtual machine (VM) may have a C: drive and a D: drive, which may be realized as respective vVols persisted by a storage system.

In one implementation, a software environment such as vSphere is responsible for creating, deleting, and modifying vVols. An administrative program called vCenter may allow virtual machine administrators to manage vVol lifecycles and settings. At the data storage level, a VASA provider may run on a storage system to enable administration and control of vVols. VASA is an acronym for vStorage APIs (Application Programming Interface) for Storage Awareness. vSphere, vCenter, and VASA are virtualization solutions developed by VMware, Inc. of Palo Alto, Calif.

SUMMARY

Certain activities performed by data storage systems require precise and timely knowledge of vVols and the virtual machines (VMs) to which they are assigned. For example, migration of VMs at the storage level involves identifying all vVols associated with a given VM and then moving all such identified vVols together at the same time from a specified source to a specified destination.

Unfortunately, available options for receiving inventory information about VMs and associated vVols is not always reliable. VM management, e.g., by vCenter, is typically separate from vVol management by a storage system, and communication between the two is not always instantaneous or consistent. VM inventory updates can be delayed by network errors, for example, and communications can get out of sync with configuration changes. In addition, administrators of data storage systems sometimes lack credentials needed for communicating with a virtual machine environment. As a result, storage systems can fail to obtain immediate access to correct information required for performing critical storage activities, such as migration, replication, snapshotting, and the like. What is needed is a way for storage systems to maintain accurate associations between vVols and VMs, which enable those storage systems to perform storage activities in a reliable and timely manner.

To address this need at least in part, an improved technique of managing virtual volumes includes receiving, by a storage system, instructions to create specified virtual volumes in the storage system, the instructions including virtual volume metadata that identifies virtual machines to which the specified virtual volumes are assigned, and providing a database that associates such virtual volumes with the virtual machines identified by the virtual volume metadata. The technique further includes performing a storage activity on a virtual machine by identifying, from the database, multiple virtual volumes that the database associates with the virtual machine and performing the storage activity on all of the identified virtual volumes together as a group.

Advantageously, the improved technique leverages commands to create virtual volumes in the storage system to maintain the database in a reliable manner. As the creation of virtual volumes in the storage system is definitive as to the virtual volumes in the storage system and their associations with virtual machines, inventory information maintained in the database is dependable by design. The technique also avoids reliance on conventional communication paths between virtual machine management and storage management components, which can sometimes be unreliable.

Certain embodiments are directed to a method of managing virtual volumes in a storage system. The method includes receiving, by the storage system, instructions to create specified virtual volumes in the storage system, the instructions providing respective virtual-volume metadata that identifies VMs (virtual machines) to which the specified virtual volumes belong. The method further includes associating the specified virtual volumes with the identified VMs in a database and, in response to a command to perform a storage activity on a designated VM, (i) querying the database to identify multiple virtual volumes that the database associates with the designated VM and (ii) performing the storage activity on the identified virtual volumes together as a group.

Other embodiments are directed to a computerized apparatus constructed and arranged to perform a method of managing virtual volumes, such as the method described above. Still other embodiments are directed to a computer program product. The computer program product stores instructions which, when executed on control circuitry of a computerized apparatus, cause the computerized apparatus to perform a method of managing virtual volumes, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique of managing virtual volumes includes receiving, by a storage system, instructions to create specified virtual volumes in the storage system, the instructions including virtual volume metadata that identifies virtual machines to which the specified virtual volumes are assigned, and providing a database that associates such virtual volumes with the virtual machines identified by the virtual volume metadata. The technique further includes performing a storage activity on a virtual machine by identifying, from the database, multiple virtual volumes that the database associates with the virtual machine and performing the storage activity on all of the identified virtual volumes together as a group.

Figure 1:
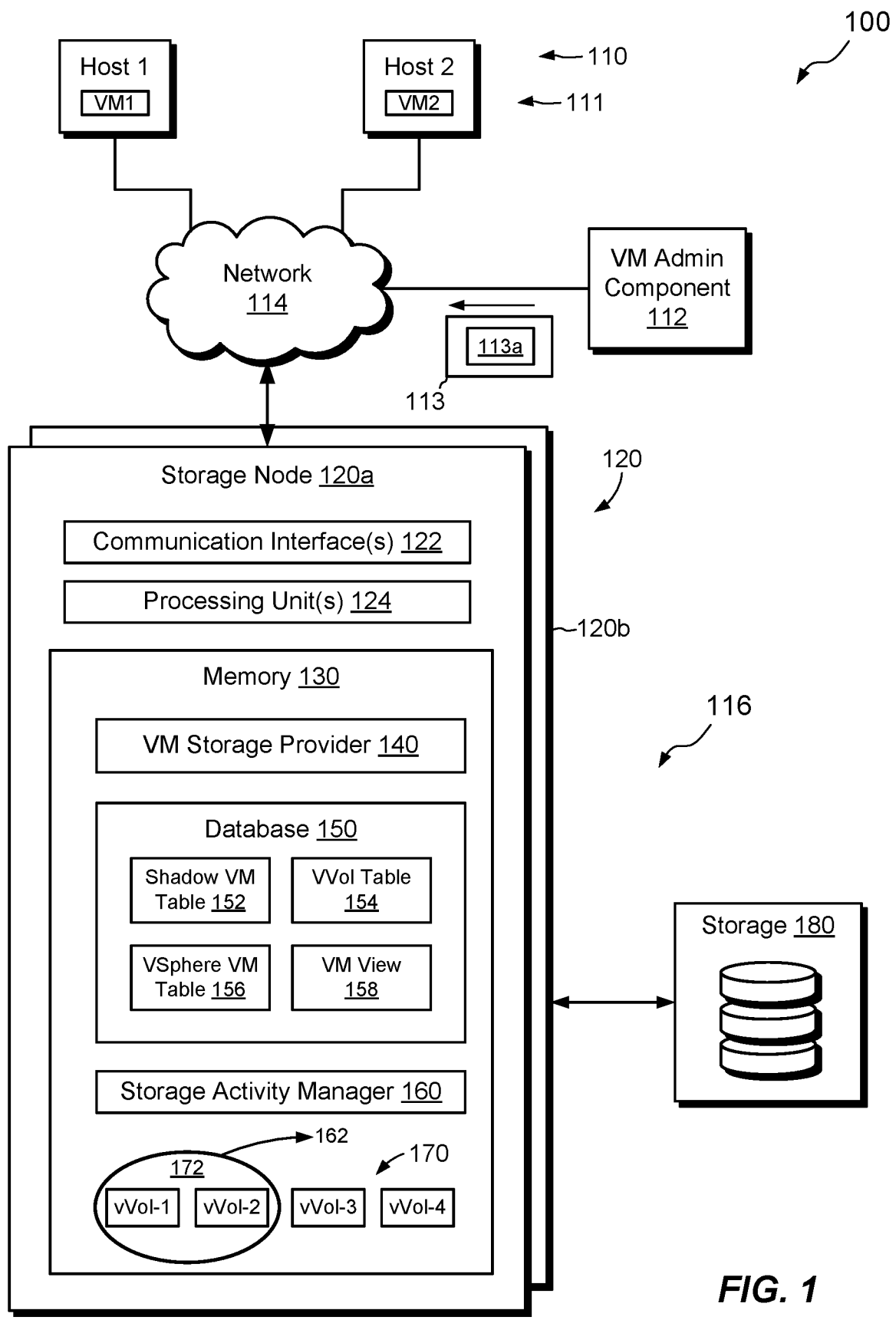
FIG. 1 is a block diagram of an example environment in which embodiments of the improved technique can be practiced.

FIG. 1 shows an example environment 100 in which embodiments of the improved technique can be practiced. Here, multiple hosts 110 access a data storage system 116 over a network 114. The hosts 110 may be configured to run virtual machines (VMs) 111, such as VM1 and VM2. For example, the hosts 110 may be configured as ESXi hosts in a vSphere environment. The environment 100 may further include a VM administrative component, such as vCenter, which may be operated by one or more human administrators.

As shown, the data storage system 116 includes storage nodes 120 (e.g., 120a and 120b), also referred to herein as storage processors or "SPs," and storage 180, such as magnetic disk drives, electronic flash drives, and/or the like. The nodes 120 may be provided as circuit board assemblies or blades, which plug into a chassis that encloses and cools them. The chassis has a backplane or midplane for interconnecting the nodes 120, and additional connections may be made among nodes using cables. In some examples, the nodes 120 are part of a storage cluster, such as one which contains any number of storage appliances, where each appliance includes a pair of nodes 120 connected to shared storage devices. No particular hardware configuration is required, however, as any number of nodes may be provided, including a single node, in any arrangement, and the nodes 120 can be any type of computing device capable of running software and processing host I/O (input/output) requests.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to a node 120 using various technologies, such as Fibre Channel, iSCSI (Internet small computer system interface), NFS (network file system), and NVMe-oF (NVMe over Fabrics). The nodes 120 are configured to receive I/O requests according to block-based and/or file-based protocols and to respond to such I/O requests by reading or writing the storage 180.

Each of the nodes 120 may include one or more communication interfaces 122, a set of processing units 124, and memory 130. Nodes 120 may have a common design but are not required to be identical. The communication interfaces 122 include, for example, SCSI target adapters and/or network interface adapters for converting electronic and/or optical signals received over the network 114 to electronic form for use by the node 120. The set of processing units 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a VM storage provider 140, a database 150, and a storage activity manager 160. In addition, memory 130 may store data objects that represent virtual volumes 170, also referred to herein as "vVols." VM storage provider 140 includes an API for managing vVols 170. For example, VM storage provider 140 is configured to communicate with hosts 110 and/or VM administrative component 112 regarding vVol creation, deletion, modification, and the like. In an example VMware implementation, VM storage provider 140 may be realized as a VASA provider. Database 150 stores information about vVols, which may be based at least in part on communications via the VM storage provider 140. As explained more fully below, example components of the database 150 include a Shadow VM Table 152, a vVol Table 154, a vSphere VM Table 156, and a VM View 158. In an example, the database 150 is a relational database, such as PostgreSQL, SQL Server, Oracle, or the like. Other types of databases may be used, including so-called no-SQL databases, provided that relationships between vVols and VMs may be specified in other ways. Storage activity manager 160 is configured to manage and orchestrate data storage activities, such as migration, replication, and snapshotting. Storage activity manager 160 may control such data storage activities on data objects individually or in groups.

The vVols 170 are data objects that the data storage system 116 is capable of managing independently. For example, data storage system 116 can independently perform migration, replication, and snapshotting of individual vVols 170. Each vVol may represent a respective disk drive of a virtual machine. For example, vVol-1 and vVol-2 are disk drives of VM1 and vVol-3 and vVol-4 are disk drives of VM2.

In example operation, a virtual machine administrator may wish to create virtual machines and associated vVols. The administrator may begin by operating the VM administrative component 112 to create a new vVol, e.g., a first vVol of a new virtual machine. In response to the administrator's actions, the VM administrative component 112 sends an instruction 113 to the data storage system 116 to create the new vVol.

The instruction 113 includes or otherwise provides virtual-volume metadata 113a. The vVol metadata 113a may include various descriptive information about the new vVol, such as its name and type, as well as an identifier of the virtual machine (VMID) to which the new vVol is assigned.

Upon receipt of the instruction 113 and associated vVol metadata 113a, the storage system 116 creates a new record in the vVol Table 154 for the new vVol. The storage system 116 also obtains the VMID from the vVol metadata 113a and checks whether a record already exists for this VMID, e.g., by querying the Shadow VM Table 152 for the specified VMID. Given that the specified vVol is the first one created for the new virtual machine, no match is found to the specified VMID and the storage system 116 proceeds to create a new object, referred to herein as a "shadow VM," using the specified VMID. For example, the database 150 creates a new record in the Shadow VM Table 152 for the specified VMID and associates the new record with the record created for the new vVol in the vVol Table 154. One should appreciate that the "shadow" VM table 152 gets its name from the fact that information about VMs is constructed indirectly from vVol metadata 113, rather than from explicit descriptions of virtual machines, such as might be available over legacy communication paths, such as the vSphere API.

The administrator may decide to create a second vVol for the same VM. To this end, the administrator directs the VM administrative component 112 to issue a second instruction 113, this time for the second vVol. The second instruction 113 includes second vVol metadata 113a that includes a name of the second vVol as well as the VMID of the virtual machine to which the second vVol is assigned. As both vVols belong to the same virtual machine, the VMID specified by the second vVol metadata matches the VMID specified by the first vVol metadata. The database 150 creates a new record in the vVol Table 154 for the second vVol, but it does not create a new record for the newly received VMID, as a record for the same VMID already exists. The database 150, which previously associated the VMID with the first vVol, further associates the same VMID with the second vVol.

The administrator may send multiple instructions 113 to create any number of vVols for the first VM, and/or for additional VMs. As the new vVols are created, the database 150 adds a new record in the vVol Table 154 for each unique vVol and adds a new record in the Shadow VM Table 152 for each unique VM.

In an example, the database 150 (or a schema provided therewith) specifies a zero-to-many or a one-to-many relationship between records in the Shadow VM Table 152 and records in the vVol Table 154. This relationship enables the storage system 116 to enumerate over all vVols associated with a given VM.

In an example, VM View 158 is a view of Shadow VM Table 152 filtered for particular criteria, such as VMID. Generating the view 158 thus involves querying the database 150 for a desired VMID (or multiple such VMIDs) and presenting a filtered view of database contents. In some examples, the query used to generate VM View 158 may specify a LEFT JOIN or INNER JOIN between the Shadow VM Table 152 and the vVol Table 154, so that the results presented by the VM View 158 reflect not only the VMs found in the Shadow VM Table 152 but also the vVols associated with those VMs.

vSphere VM Table 156 is an optional component that reflects information about VMs obtained via legacy communication paths, such as the vSphere API. In an example, the VM View 158 merges information from the vSphere VM Table 156 with information from the Shadow VM Table 152 and the vVol Table 154 to provide a more comprehensive rendering of information about VMs. As information from the vSphere VM Table 156 is not necessarily timely or reliable, such information may be used merely to supplement the reliable information from the Shadow VM Table 152 and the vVol Table 154. Such additional information might be useful to a storage system administrator.

The ability of the storage system 116 to enumerate over all vVols that belong to a particular VM enables storage activity manager 160 to perform migration, replication, snapshotting, and other storage activities at the level of VMs, rather than at the more granular level of vVols. For example, storage activity manager 160 may process a command 162 to perform migration or some other activity on a particular VM by querying the database 150 for all vVols 172 associated with that particular VM (e.g., using the VM View 158) and then implementing migration on all such vVols 172 as a group. The storage activity manager 160 may similarly aggregate vVols for replication and snapshotting at the per-VM level. It is often more convenient for administrators to manage virtual machine resources at the per-VM level than at the per-vVol level, and the disclosed technique readily allows for per-VM level management. Also, it does so without being subjected to VM inventory errors that can arise when using legacy communication paths.

Figure 2:
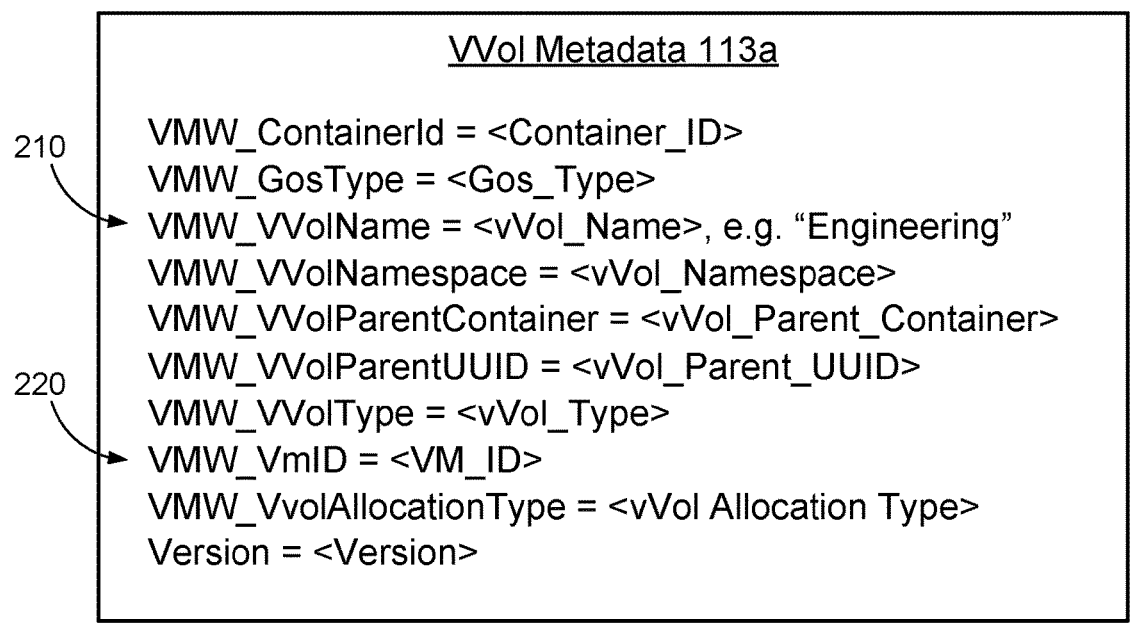
FIG. 2 is a diagram showing example vVol metadata of FIG. 1.

FIG. 2 shows example constituents of vVol metadata 113a. As shown, vVol metadata 113a includes multiple key-value pairs that provide descriptive information about a vVol being created. Of note are key-value pairs for vVol name 210 (VMW_VVolName) and virtual machine identifier 220 (VMW_VmID). In an example, the virtual machine identifier 220 provides the above-described VMID, which enables aggregation of multiple vVols for a particular VM.

Not appearing among the vVol metadata 113a is any name of the virtual machine to which the vVol is assigned. By convention, the storage system 116 may assign the name of the VM to be the name 210 of the first vVol created for that VM. The first vVol created for a VM is generally a config-type vVol, and each VM generally has only one config-type vVol (other vVol types include data, memory, and swap-type vVols). Thus, the name of the VM is generally taken as the name of the config-type vVol created for that VM. If the vVol name 210 specified in the vVol metadata 113a is "Engineering," for example, the storage system 116 assigns the same name "Engineering" to the VM. In some examples, the name that the storage system assigns to a VM is not necessarily identical to the name of the first vVol but is rather based thereon in some deterministic way. For instance, a prefix or suffix may be applied, or other predetermined transformations may be used. "Engineering" may be changed to "Engineering-VM," for example. In any case, the name of a VM may be stored in the database 150 and used within the storage system 116 as a shorthand way of identifying the VM.

Figure 3:
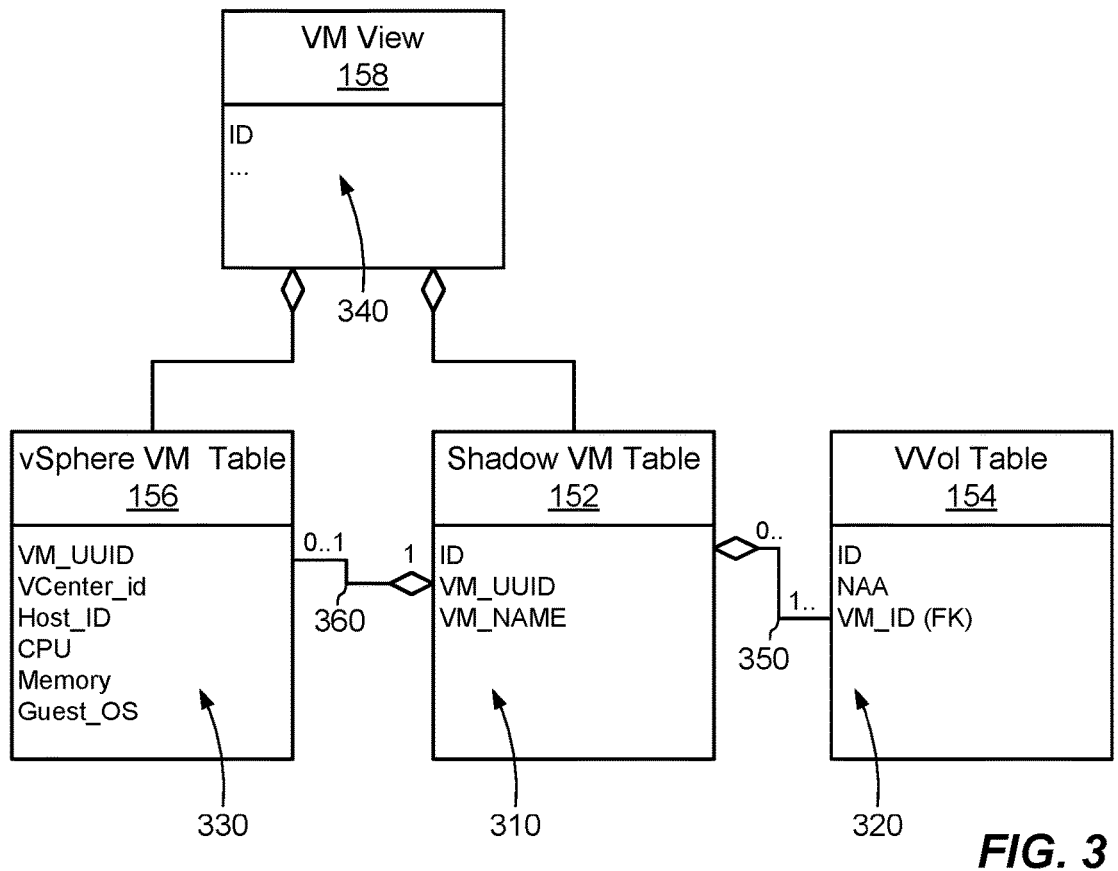
FIG. 3 is an example entity-relationship diagram of the database of FIG. 1.

FIG. 3 shows an example object model of the database 150 in the form of an entity-relationship diagram, which includes representations of the Shadow VM Table 152, the vVol Table 154, the vSphere VM Table 156, and the VM View 158. As shown, the Shadow VM Table 152 may include the following fields 310:

ID. E.g., an auto-incrementing integer used as a primary key for uniquely identifying records in the Shadow VM Table 152;

VM_UUID). E.g., a universally unique identifier of the VM as obtained from the VMW_VmID key-value pair 220 in the vVol metadata 113a.

VM_NAME. E.g., a name assigned to the VM by the storage system 116, typically based on the value of VMW_VVolName key-value pair 210 for the first vVol created for the VM.

Any number of other fields 310 may be provided based on other vVol metadata 113a and/or other information known to the storage system 116.

As further shown in FIG. 3, vVol Table 154 may include the following fields 320:

ID. E.g., an auto-incrementing integer used as a primary key for uniquely identifying records in the vVol Table 154;

NAA. A Network Addressing Authority identifier of the vVol, which may be assigned or otherwise obtained by the storage system 116.

VM_ID. E.g., a VM identifier used as a foreign key that refers to the ID field in the Shadow VM Table 152.

Other fields 320 may be provided as needed or desired.

The optional vSphere table 156 may include at least one field 330 that allows VMs described therein to be associated with VMs recorded in the Shadow VM Table. For example, the vSphere VM Table 156 includes a "VM_UUID" field that corresponds to the same-named field of the Shadow VM Table 152 and allows records of the two tables to be associated base on matching VM_UUID values.

Fields 340 generated for presentation by the VM View 158 are preferably selectable by administrators, other users, and/or programs. For example, administrators may provide customized queries of the tables 152, 154, and 156, specifying query criteria in the form of designated virtual machines, vVols, and/or names, for example, with the VM View 158 then providing the requested content as output. Such output may be displayed to a human administrator and/or provided as input to a software program, such as the storage activities manager 160.

FIG. 3 further shows example relationships among the various tables. For example, the ID field of the Shadow VM Table 152 has a relationship 350 specifying zero-to-many with the VM_ID (FK) field of the vVol Table 154. The relationship 350 may be zero-to-many (rather than one-to-many) to support situations in which a vVol is stored in the vVol Table 154 without there being any associated virtual machine stored in the Shadow VM Table 152. One example scenario is where an "orphan" vVol contains housekeeping data used by the VM administrative component 112 (or other component). In such cases the vVol metadata 113a may have an empty VM identifier 220. Another example scenario is where a vVol record is normally created in the vVol Table 154 before an associated VM record is created in the Shadow VM Table 152. If storing database records for orphan vVols is not desired, and if vVol records are always created after VM records, then the relationship 350 may be provided as one-to-many rather than as zero-to-many.

Relationship 360 specifies a one-to-zero-or-one relationship between the Shadow VM Table 152 and the vSphere VM Table 156, with the relationship 360 based on matching VM_UUID values in the respective tables. As stated previously, the vSphere VM Table 156 is optional. A given record in the Shadow VM Table 152 might not correspond to any record in the vSphere VM Table 156. At most, one record in the vSphere VM Table 156 corresponds to a record in the Shadow VM Table 152.

VM View 158 represents a merger or union of query results from the Shadow VM Table 152 and the vSphere VM Table 156. For example, if a given VM_UUID for a VM is found in both tables, the VM View 158 may present information about that VM from both tables side-by-side.

Some examples may support many-to-many relationships between VMs and vVols. For instance, a data-type vVol may be shared among multiple VMs. In such examples, vVol metadata 113 for a shared vVol may include multiple VM identifiers 220, one for each VM that shares the vVol. To support such examples, an additional table (not shown) may be provided, which stores associations between VMs and vVols. For example, such a table may include a VM field and a vVol field and may store multiple pairs of associations between VMs and vVols.

Figures 4, 5, 6:
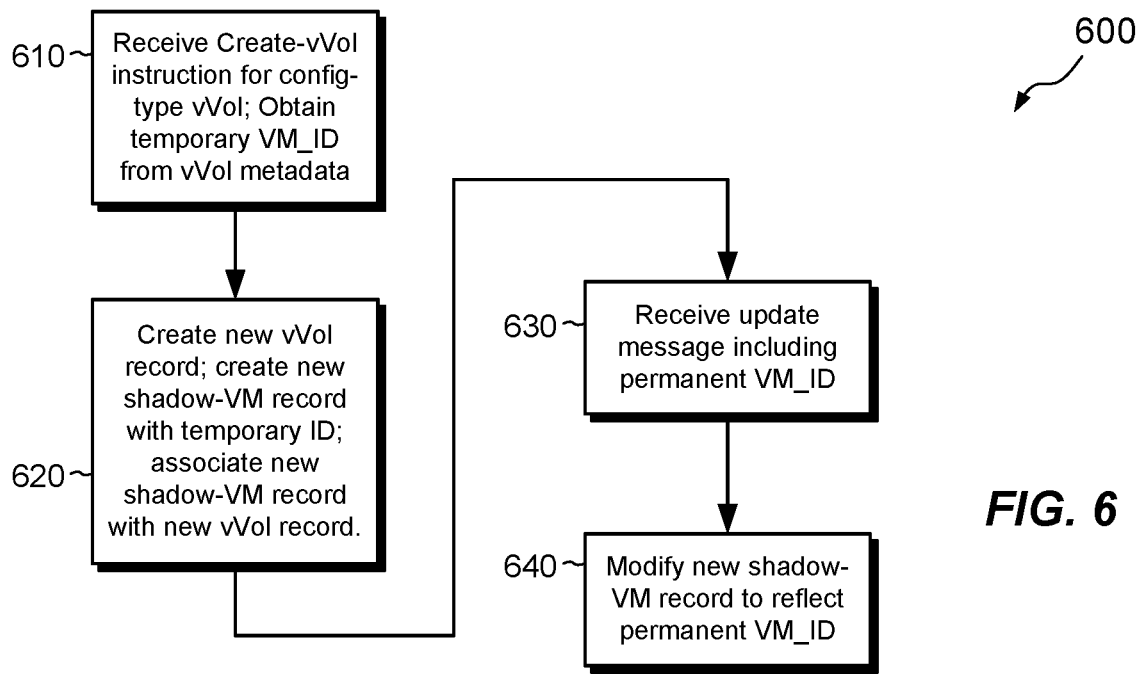
FIG. 4 is a table view of an example Shadow VM Table of the database of FIG. 1.
FIG. 5 is a table view of an example vVol Table of the database of FIG. 1.
FIG. 6 is a flowchart showing an example method of managing and updating VM identifiers.

FIGS. 4 and 5 respectively show example table views of the Shadow VM Table 152 and the vVol Table 154, populated with example values. As shown, each VM_UUID in the Shadow VM Table 152 of FIG. 4 is unique, and each NAA in the NAA in the vVol Table 154 of FIG. 5 is unique. Also, autoincrementing IDs are unique within the respective tables. Here, a one-to-many relationship between VMs and vVols can plainly be seen. For instance, the "Engineering" VM with ID=1 in FIG. 4 is associated with two vVols in FIG. 5 having VM_ID=1 in (i.e., vVol IDs 1 and 2). Likewise, the "Accounting" VM with ID=2 in FIG. 4 is associated with two vVols in FIG. 5 having VM_ID=2 (i.e., vVol IDs 3 and 4). The relationship 350 among the tables 152 and 154 allow the storage system 116 to enumerate all vVols belonging to any designated VM.

Another workable solution for establishing the desired zero or one-to-many relationship would be to store VM UUIDs in the VM_ID field of the vVol Table 154, rather than integer ID numbers. For instance, the VM_ID field of table 154 could store "dca912 . . . " for vVol 1 and vVol 2 and could store "abc321 . . . " for vVol 3 and vVol 4. Doing so would still maintain the desired one-to-many relationship, but it would require a great deal more memory. It would also make certain updates more difficult, such as the ones described in connection with FIG. 6.

Although the example tables 152 and 154 include only a small number of records, corresponding tables in a real storage system may include tens or hundreds of entries, depending on the number of vVols and VMs supported. Eventually, the administrator of the VM administrative component 112 may delete vVols and destroy VMs. On the storage side, a vVol record in the vVol Table 154 may be deleted in response to an instruction from the VM administrative component 112 to delete the corresponding vVol. As for VMs, the storage system may delete a record for a VM from the Shadow VM Table 152 in response to the last vVol assigned to that VM being deleted.

Figure 7:
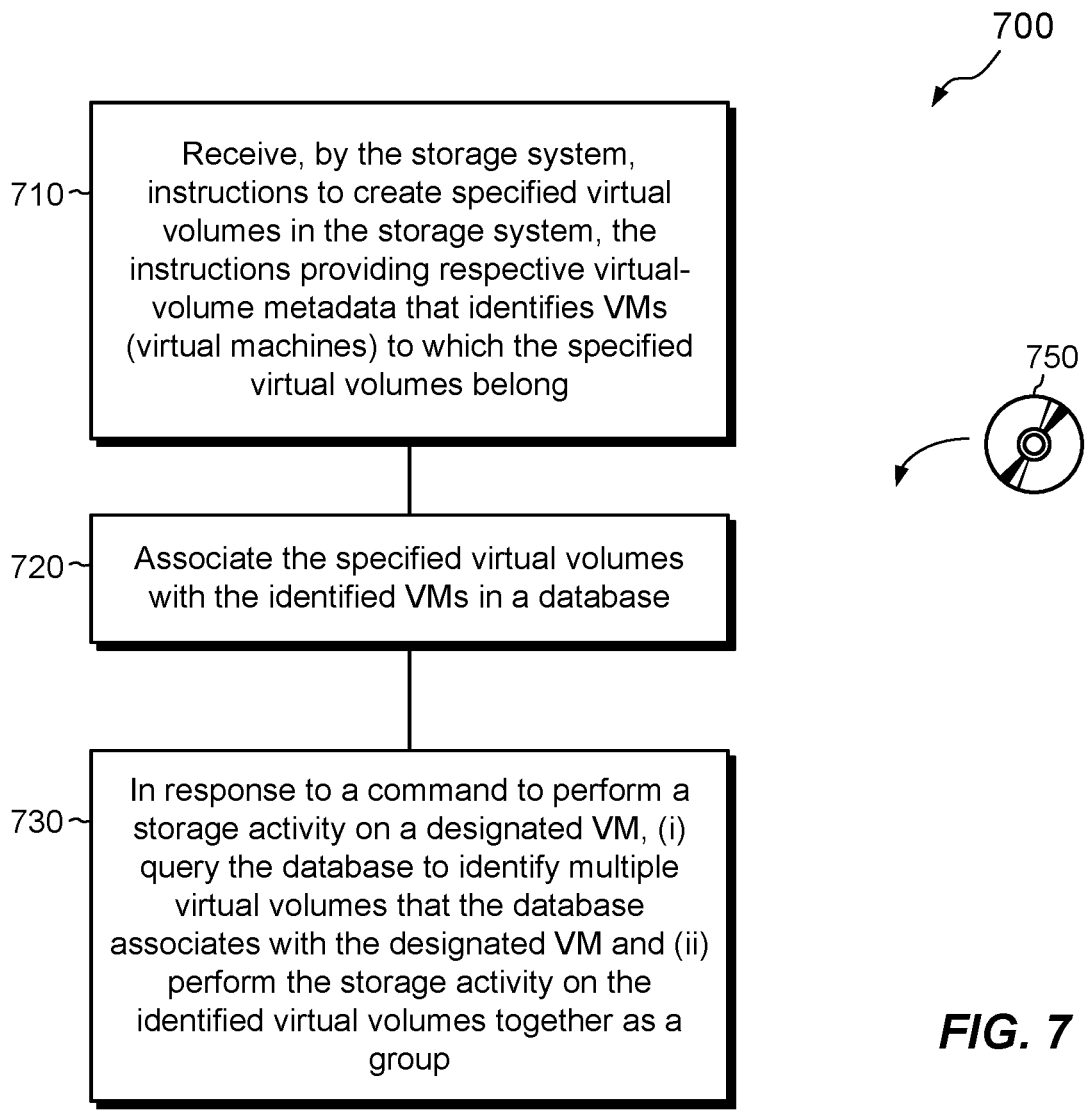
FIG. 7 is a flowchart showing an example method of managing virtual volumes in a storage system.

FIGS. 6 and 7 show example methods 600 and 700 that may be carried out in connection with the environment 100. The methods 600 and 700 are typically performed, for example, by the software constructs described in connection with FIG. 1, which reside in the memory 130 of a storage node 120 and are run by the set of processors 124. The various acts of methods 600 and 700 may be ordered in any suitable way. Accordingly, embodiments may be constructed in which acts are performed in orders different from those illustrated, which may include performing some acts simultaneously.

FIG. 6 shows an example method 600 for managing shadow VMs in the database 150. The need for method 600 arises when the VM administrative component 112 begins creating a vVol for a VM before having obtained a VM identifier for that VM. In such cases, the VM administrative component 112 may provide a temporary VM identifier for use by the storage system 116 until a permanent VM identifier can be obtained.

For example, at 610 the storage system 116 receives a create-vVol instruction 113 to create a new, config-type vVol. The storage system obtains the temporary VM identifier from the key-value field 220 in the associated vVol metadata 113a.

At 620 the storage system creates a new vVol record for the new vVol in the vVol Table 154. It also creates a new shadow-VM record in the Shadow VM Table 152, using the temporary ID as the value of the VM_UUID field. The storage system 116 further associates the new shadow-VM record with the new vVol record, e.g., by providing the ID of the new shadow-VM record (an integer) as the value of the VM_ID field of the new vVol record.

At 630, the storage system 116 receives an update message that provides a permanent VM identifier to replace the previously-assigned temporary identifier.

At 640 the storage system 116 updates the new shadow VM record to replace the temporary identifier, stored in the VM_UUID field, with the newly received permanent identifier. It is noted that no change is needed to the vVol Table 154, as the integer ID number in the VM_ID field remains the same.

FIG. 7 shows an example method 700 of managing virtual volumes in a storage system and provides a summary of certain features and aspects of embodiments described above.

At 710, the storage system 116 receives instructions 113 to create specified virtual volumes 170 in the storage system. The instructions 113 provide respective virtual-volume metadata 113a that identifies VMs (virtual machines) 111 to which the specified virtual volumes 170 belong.

At 720, the specified virtual volumes 170 are associated with the identified VMs 111 in a database 150.

At 730, in response to a command 162 to perform a storage activity on a designated VM, (i) the database 150 is queried to identify multiple virtual volumes 172 that the database 150 associates with the designated VM and (ii) the storage activity is performed on the identified virtual volumes 172 together as a group.

An improved technique has been described for managing virtual volumes in a data storage system 116. The technique includes receiving, by the storage system, instructions 113 to create specified virtual volumes 170 in the storage system 116, the instructions 113 including virtual volume metadata 113a that identifies virtual machines 111 to which the specified virtual volumes 170 are assigned, and providing a database 150 that associates such virtual volumes 170 with the virtual machines 111 identified by the virtual volume metadata 113a. The technique further includes performing a storage activity on a virtual machine 111 by identifying, from the database 150, multiple virtual volumes 172 that the database 150 associates with the virtual machine 111 and performing the storage activity on all of the identified virtual volumes 172 together as a group.

Having described certain embodiments, numerous alternative embodiments or variations can be made. For example, certain embodiments have been presented in the context of a VMware environment. This is not required, however. Other embodiments may be realized in other virtual-machine environments, such as Microsoft Hyper-V and Linux KVM environments, for example.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 750 in FIG. 7). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing virtual volumes in a storage system, comprising:
receiving, by the storage system, instructions to create specified virtual volumes in the storage system, the instructions providing respective virtual-volume metadata that identifies VMs (virtual machines) to which the specified virtual volumes belong;
associating the specified virtual volumes with the identified VMs in a database, including creating a respective shadow VM object for each unique VM specified by the virtual-volume metadata provided with the instructions; and
in response to a command to perform a storage activity on a designated VM, (i) querying the database to identify the shadow VM object associated with the designated VM and multiple virtual volumes that the shadow VM object in the database associates with the designated VM and (ii) performing the storage activity on the identified virtual volumes together as a group.

2. The method of claim 1, further comprising:
receiving, by the storage system, a first instruction to create a first virtual volume, the first instruction providing first virtual-volume metadata that describes the first virtual volume;
obtaining a first VM identifier from the first virtual-volume metadata received with the first instruction; and
creating a first shadow VM object in the database,
wherein the database associates the first shadow VM object with the first VM identifier and with the first virtual volume.

3. The method of claim 2, wherein creating the first shadow VM object is performed based on the database not already storing a shadow VM object having the first VM identifier.

4. The method of claim 2, wherein the first VM identifier is a temporary identifier of the first VM, and wherein the method further comprises, after creating the first shadow VM object, updating the database to include a permanent identifier of the first VM.

5. The method of claim 2, further comprising:
receiving, by the storage system, a second instruction to create a second virtual volume, the second instruction providing second virtual-volume metadata that describes the second virtual volume;
obtaining a second VM identifier from the second virtual-volume metadata received with the second instruction; and
in response to the second VM identifier matching the first VM identifier, associating, by the database, the second virtual volume with the first shadow VM.

6. The method of claim 2, wherein the first virtual-volume metadata includes a name of the first virtual volume, and wherein the method further comprises assigning a name to the first shadow VM in the database based on the name of the first virtual volume.

7. The method of claim 2, wherein creating the first shadow VM object includes adding a first record in a first database table of the database, the first database table including a first field representing a VM identifier and a second field representing a corresponding VM name, the first record storing the first VM identifier in the first field.

8. The method of claim 7, further comprising creating a second record for the first virtual volume in a second database table of the database, the second database table having a first field representing a virtual-volume identifier and a second field representing a corresponding VM identifier.

9. The method of claim 8, wherein the database maintains a zero-to-many or one-to-many relationship from the first field of the first database table to the second field of the second database table.

10. The method of claim 9, further comprising, in response to the storage system receiving an indication that the first virtual volume is being moved from the first VM to a second VM, updating the second field of the second record to replace the VM identifier of the first VM with a VM identifier of the second VM.

11. The method of claim 7, wherein the database further includes a third database table containing information about VMs obtained by the storage system based on communication with a VM administrative component.

12. The method of claim 11, further comprising merging data from the first database table and the second database table into a view that provides information about VMs derived from both (i) virtual-volume metadata received by the storage system and (ii) the information about VMs obtained by the storage system based on communication with the VM administrative component.

13. The method of claim 2, wherein performing the storage activity on the identified virtual volumes together as a group includes performing migration on all virtual volumes belonging to the designated VM.

14. A computerized apparatus, comprising control circuitry that includes a set of processing units coupled to memory, the control circuitry constructed and arranged to:
receive, by the storage system, instructions to create specified virtual volumes in the storage system, the instructions providing respective virtual-volume metadata that identifies VMs (virtual machines) to which the specified virtual volumes belong;
associate the specified virtual volumes with the identified VMs in a database, including to create a respective shadow VM object for each unique VM specified by the virtual-volume metadata provided with the instructions; and
in response to a command to perform a storage activity on a designated VM, (i) query the database to identify the shadow VM object associated with the designated VM and multiple virtual volumes that the shadow VM object in the database associates with the designated VM and (ii) perform the storage activity on the identified virtual volumes together as a group.

15. A computer program product including a set of non-transitory, computer-readable media having instructions which, when executed by control circuitry of a computerized apparatus, cause the computerized apparatus to perform a method of managing virtual volumes, the method comprising:
receiving, by the storage system, instructions to create specified virtual volumes in the storage system, the instructions providing respective virtual-volume metadata that identifies VMs (virtual machines) to which the specified virtual volumes belong;
associating the specified virtual volumes with the identified VMs in a database; and
in response to a command to perform a storage activity on a designated VM, (i) querying the database to identify multiple virtual volumes that the database associates with the designated VM and (ii) performing the storage activity on the identified virtual volumes together as a group,
wherein the method further comprises:
receiving, by the storage system, a first instruction to create a first virtual volume, the first instruction providing first virtual-volume metadata that describes the first virtual volume;
obtaining a first VM identifier from the first virtual-volume metadata received with the first instruction; and
creating a shadow VM object in the database,
wherein the database associates the shadow VM object with the first VM identifier and with the first virtual volume.

16. The computer program product of claim 15, wherein the first VM identifier is a temporary identifier of the first VM, and wherein the method further comprises, after creating the shadow VM object, updating the database to include a permanent identifier of the first VM.

17. The computer program product of claim 15, wherein the method further comprises:

receiving, by the storage system, a second instruction to create a second virtual volume, the second instruction providing second virtual-volume metadata that describes the second virtual volume;

obtaining a second VM identifier from the second virtual-volume metadata received with the second instruction; and in response to the second VM identifier matching the first VM identifier, associating, by the database, the second virtual volume with the shadow VM.

18. The computer program product of claim 15, wherein the first virtual-volume metadata includes a name of the first virtual volume, and wherein the method further comprises assigning a name to the shadow VM in the database based on the name of the first virtual volume.

19. The computer program product of claim 15, wherein performing the storage activity on the identified virtual volumes together as a group includes performing migration on all virtual volumes belonging to the designated VM.

20. The method of claim 1, wherein the storage activity includes at least one of snapshotting, migration, and replication on the identified virtual volumes together as a group.

* * * * *